W. & A. GAULIN.
EVAPORATING APPARATUS.
APPLICATION FILED JULY 11, 1908.
927,520.
Patented July 13, 1909.
7 SHEETS—SHEET 6.
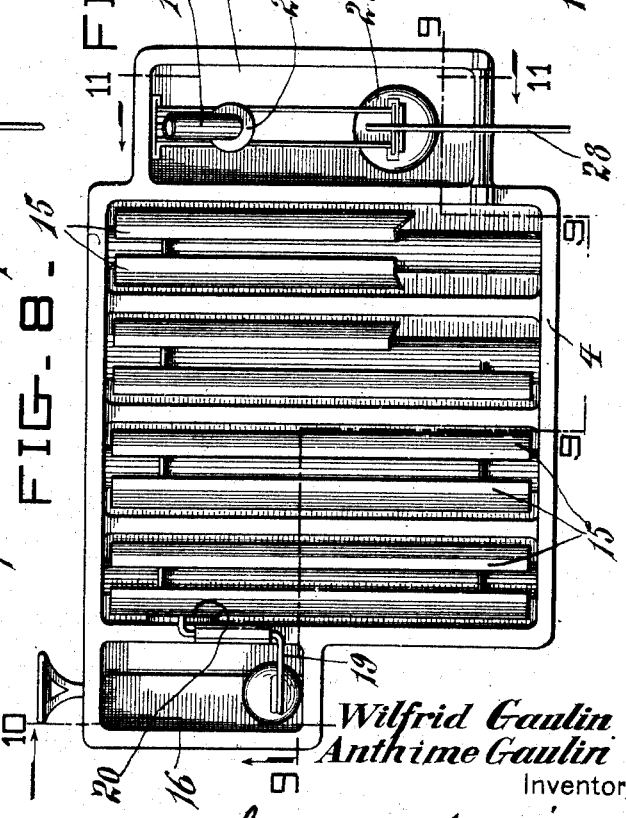
Wilfrid Gaulin
Anthime Gaulin
Inventors

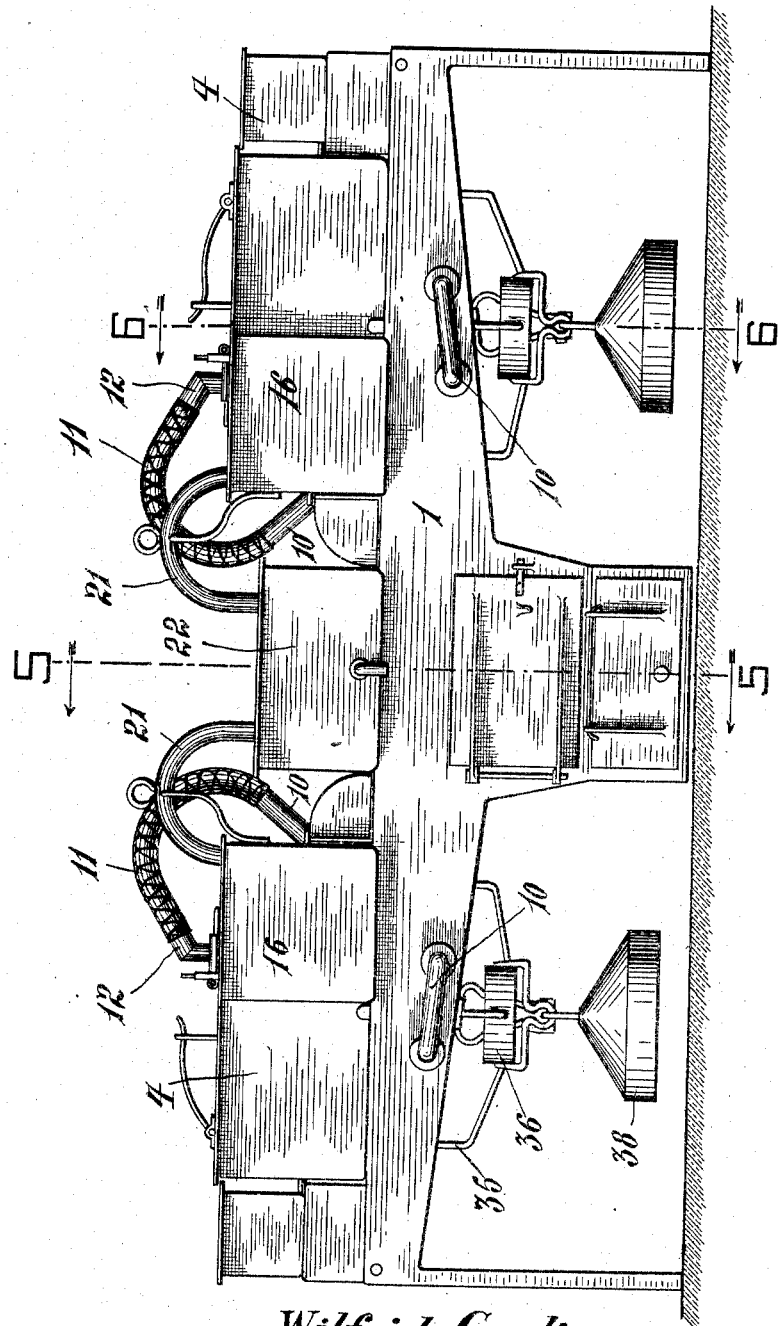

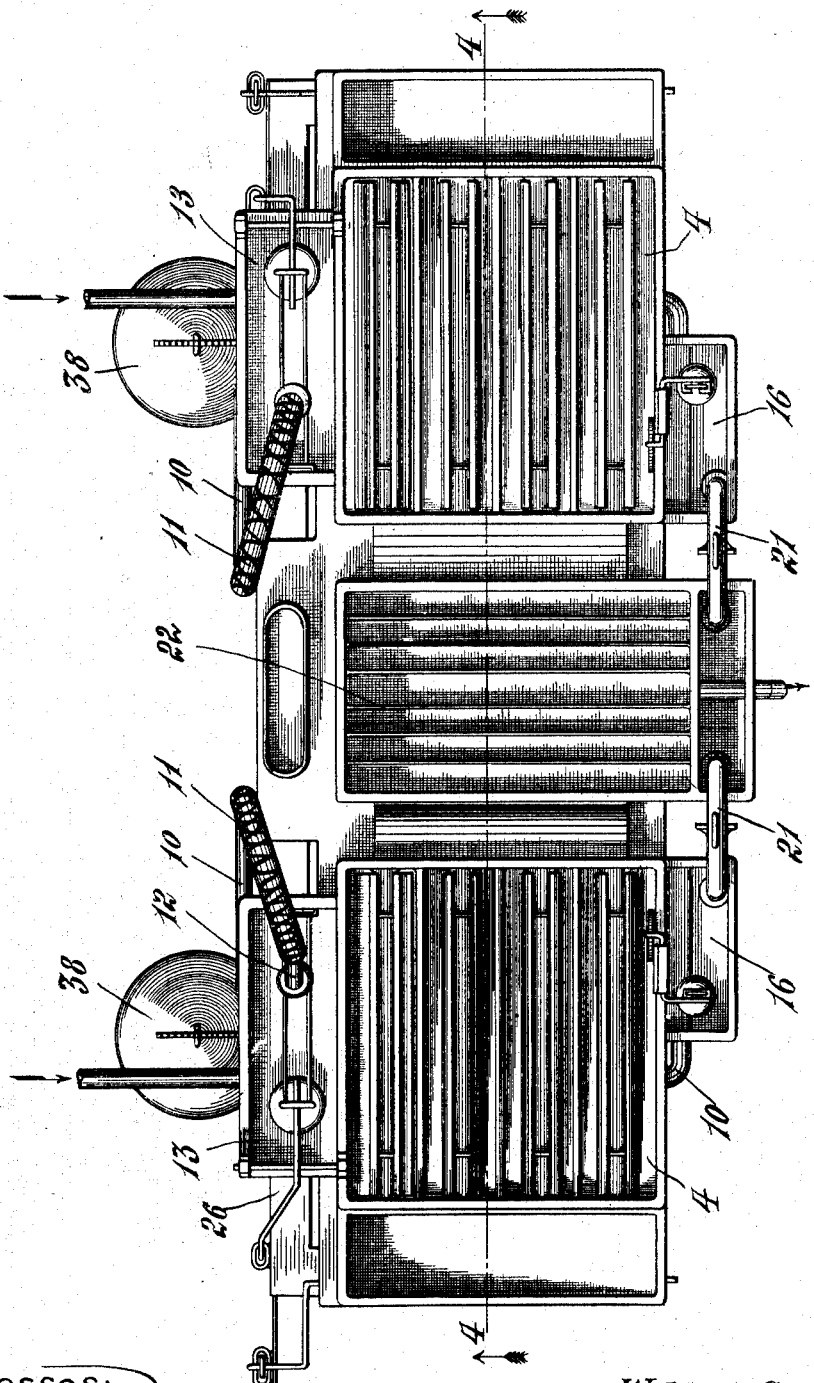

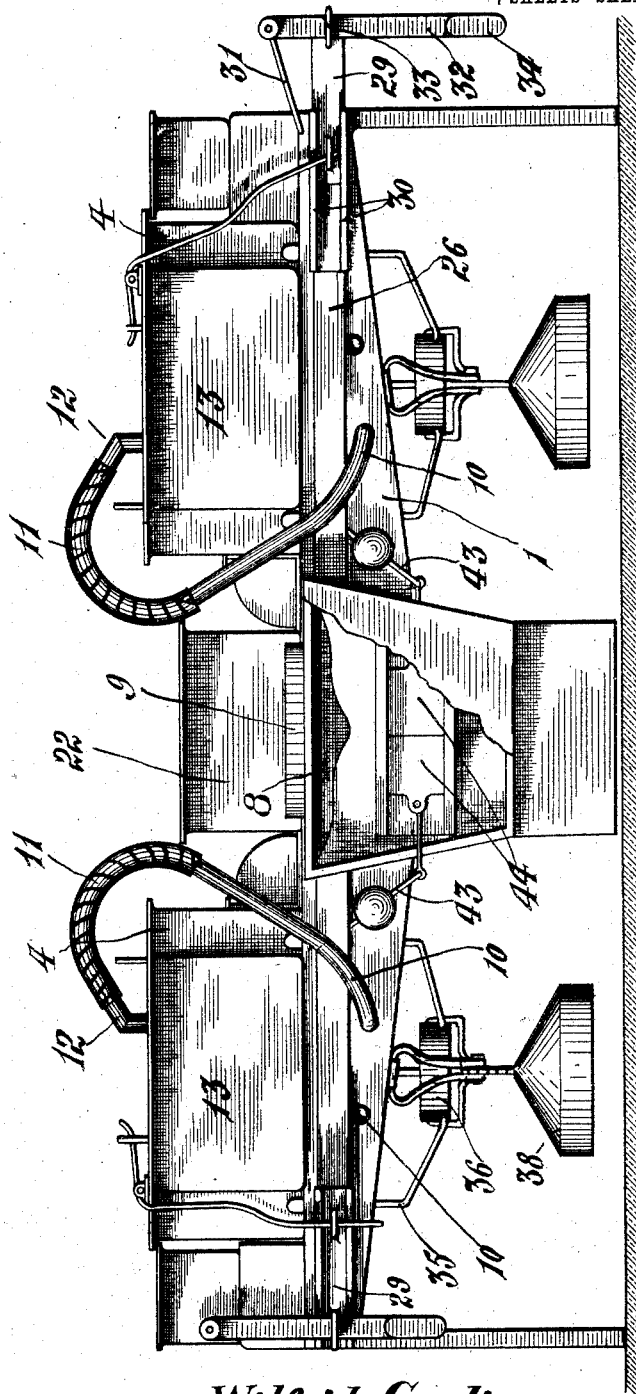

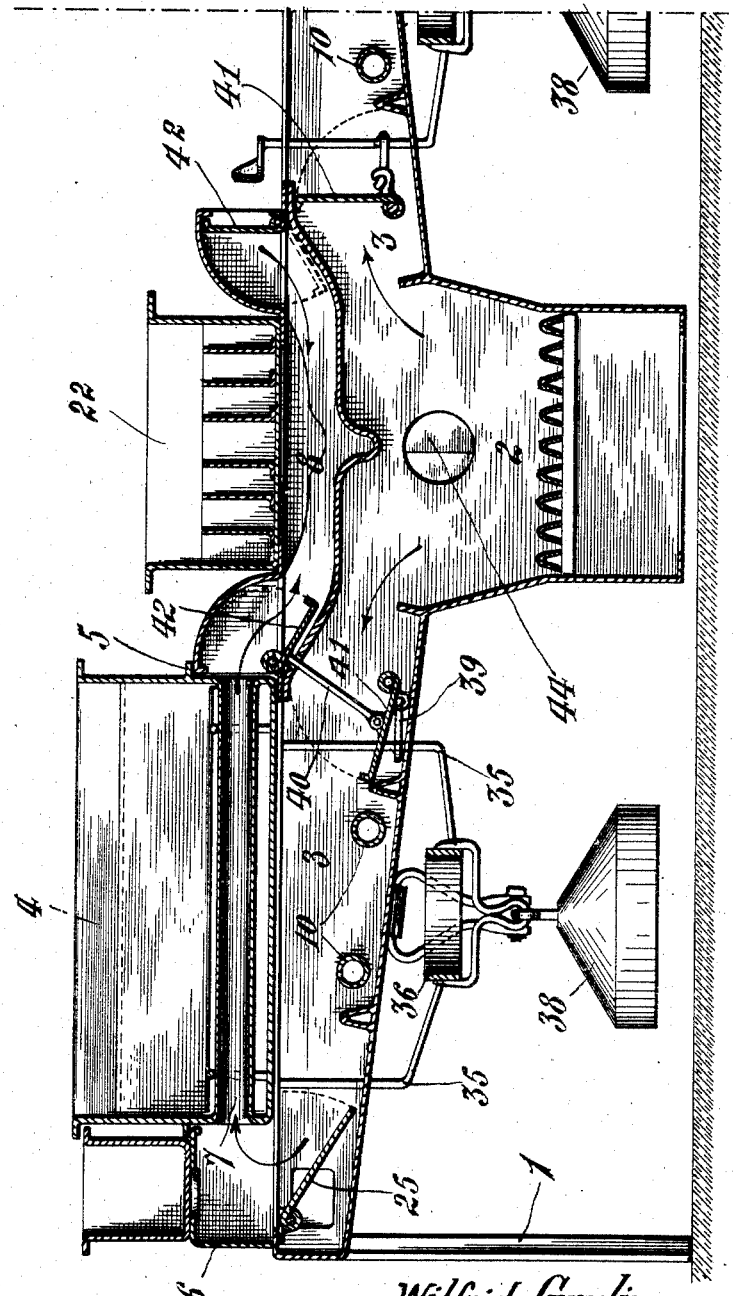

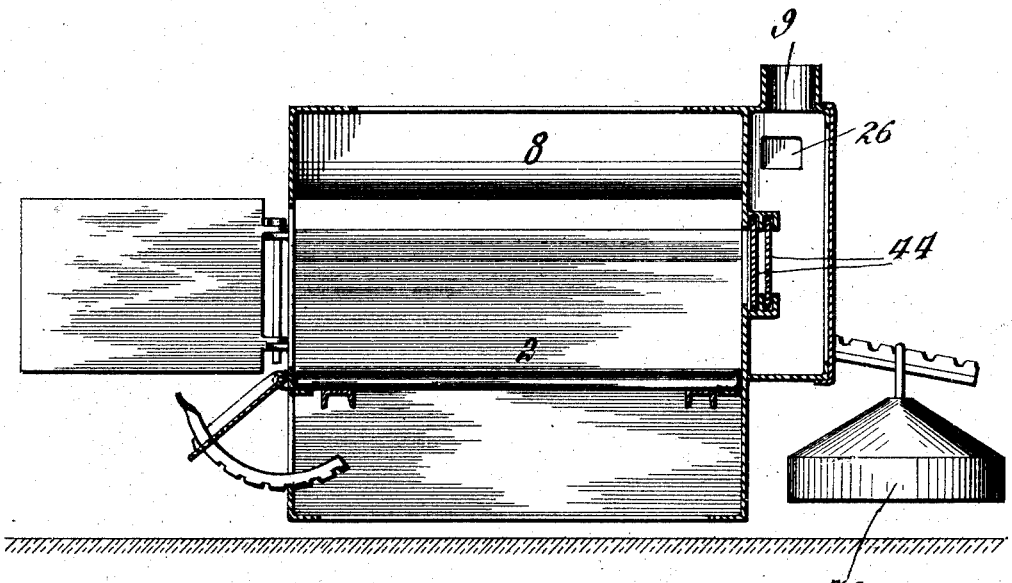
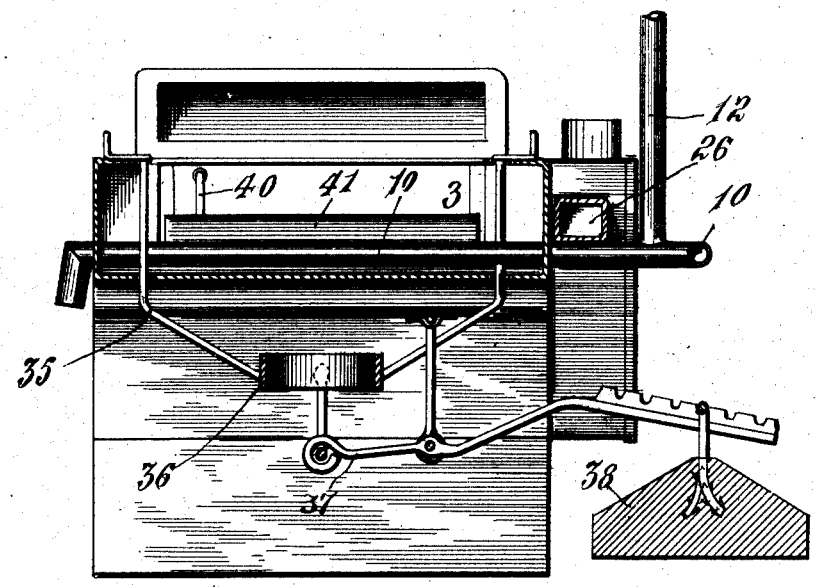

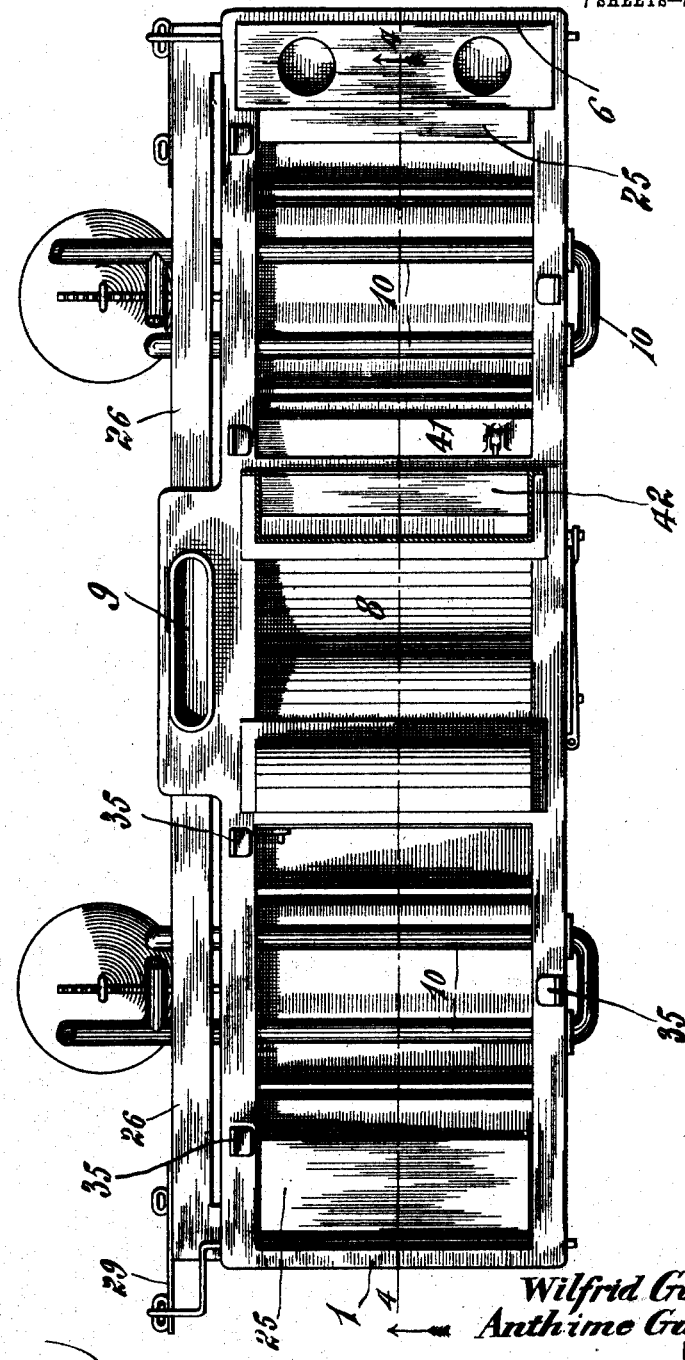

UNITED STATES PATENT OFFICE.

WILFRID GAULIN AND ANTHIME GAULIN, OF ST. CESAIRE, QUEBEC, CANADA.

EVAPORATING APPARATUS.

No. 927,520.            Specification of Letters Patent.            Patented July 13, 1909.

Application filed July 11, 1908. Serial No. 443,072.

*To all whom it may concern:*

Be it known that we, WILFRID GAULIN and ANTHIME GAULIN, subjects of the King of Great Britain, residing at St. Cesaire, in the county of Rouville, Province of Quebec, Canada, have invented certain new and useful Improvements in Evaporating Apparatus; and we do hereby declare that the following is a full, clear, and exact description of the invention, such as will enable others skilled in the art to which it appertains to make and use the same.

The present invention relates to evaporating apparatus, and more particularly to the general class of evaporating apparatus used in the manufacture of commercial maple syrup.

Broadly speaking, it comprises a suitable frame or support, a stove or other heating device placed centrally of the frame, a duplicate arrangement of evaporating pans, circulating pipes and dampers mounted in the frame to either side of the stove, means for automatically regulating the delivery of sap to and from the evaporating pans, a receiving pan to which the sap is automatically delivered from the evaporating pans, and means for automatically raising an evaporating pan from the frame when the sap therein falls below a predetermined point or amount.

In order to more clearly disclose the construction, operation and use of the invention, reference should be had to the accompanying drawings forming part of the present application.

Throughout the several views of the drawings like reference characters designate the same parts.

In the drawings: Figure 1 is a front elevation of the entire apparatus; Fig. 2 is a plan view of the same; Fig. 3 is a rear elevation of the same; Fig. 4 is a partial central vertical longitudinal section of the apparatus on line 4—4 of Fig. 2; Fig. 5 is a cross section on line 5—5 of Fig. 1, looking in the direction of the arrow; Fig. 6 is a cross section on line 6—6 of Fig. 1, looking in the direction of the arrow; Fig. 7 is a side elevation of Fig. 8; Fig. 8 is a plan view of one of the evaporating pans; Fig. 9 is a section on line 9—9 of Fig. 8, looking in the direction of the arrow; Fig. 10 is a section on line 10—10 of Fig. 8, looking in the direction of the arrow; Fig. 11 is a section on line 11—11 of Fig. 8 looking in the direction of the arrow; and, Fig. 12 is a plan view of the apparatus with the evaporating pans omitted.

Referring to the drawings in detail, 1 represents a strong supporting frame of any desired construction and shape. This frame is formed to present a large fire box or heating chamber 2 about centrally thereof and broad heat conveying flues 3 leading upwardly therefrom toward the ends of the frame. The portions of the frame lying between the center and the opposite ends are provided with sets of apparatus which are duplicates in all essential features, and for that reason a description of one of such sets will be sufficient for a clear understanding of the two sets.

On referring to Fig. 4 it will be noticed that a section of one set of the apparatus is shown in longitudinal cross section. This comprises a large evaporating pan 4 provided with flanges 5 by which it may be supported on the adjacent edges of the frame. It will be noticed that the bottom of the pan is of slightly less length than the portion of the frame above which it is supported. Such differences in length leaves a wide opening extending across the end of the frame 1 and communicating with the flue 3. This opening is covered by a hood 6 so constructed as to form a stove section on which various utensils may be placed. The lower part of the pan 4 is provided with a plurality of transversely extending heating pipes 7 running clear through from side to side of the pan and communicating at opposite ends, respectively, with the upper end of the heating flues 3 and an upper central heating passage or chamber 8 which extends completely across the center of the frame and directly above the fire box. From the passage 8 the products of combustion and excess heat pass into the chimney or flue 9.

The raw sap is fed to the evaporating pans 4 through a pipe 10 which is doubled on itself and passed twice transversely through the flue 3 to give the sap a preliminary heating. From the pipe 10 it passes into the flexible tube 11 and from that again into a second pipe 12 from which it flows to a tank 13. The tank 13 communicates with the pan 4 by way of the opening 14. In the pan 4 its first evaporation is effected by the heating tubes 7. In order to insure better circulation of the sap and more thorough evaporation, circulation plates 15 have been placed over the tubes and spaced slightly therefrom. Such an arrangement forces the heated sap to circulate in close proximity to the heating pipes. On the completion of its first evaporation the sap passes, by way of opening 17, to a second tank 16 at the opposite side of the pan. This second tank is so constructed that its bottom is slightly below the bottom of the pan 4. In the tank 16 is a float 18, to the upper end of which is connected an arm of the rod 19 which carries a closure 20 adapted to close the opening 17. Thus, as the sap rises beyond a certain predetermined point in the tank 16, the float 18 will operate the closure 20 and prevent further flow of the sap. From the tank 16 the sap passes by siphon pipes 21 to the final evaporation pan 22 placed at the center of the apparatus and slightly below the other pans. From this last pan the syrup is drawn off in any suitable way and is ready for immediate shipment.

In order to secure the best results the sap should not be delivered to the pans in too great quantities. It should be only a little more than sufficient, in depth, to cover the tubes 7 and plates 15. A depth of this extent will insure rapid evaporation and best results. To maintain such a depth automatically a float 23 is pivotally mounted in the tank 13 and adapted to rise and fall with the sap as it is supplied to the tank 13 and pan 4. To the arm of the float is fixed a plate or stopper 24 which fits over and completely closes the end of the delivery pipe 12. It follows that, as soon as the predetermined depth of sap has been supplied to the tank 13 and pan 4, further supply will be cut off. Of course, while the pan 4 is practically empty and the first supply is being fed into it, it is not desirable to heat the pan. For that purpose a damper 25 is provided which shuts off the heat and deflects it toward the flue or opening through which it passes into the longitudinally extending flue 26 from which it is finally delivered to the chimney. To simplify the operation of the machine this damper is worked automatically by the float 23. The connections between the damper and float comprise a link 27 adapted to loosely receive the upper end of the bent lever rod 28, the lower end of which is loosely connected to a slide 29 movably mounted in ways 30 on the frame, a crank arm 31 extending from the damper and a weighted arm 32 pivotally connected to the crank arm. This weighted arm passes through a loop 33 secured to slide 29 and is provided with a heavy weight 34 at its lower end. This weight is sufficient to maintain the perpendicular position of the arm. Therefore, as the arm 32 is moved horizontally by the slide it will rock the crank arm 31 and close the damper. Consequently, as the sap falls below the predetermined point in the tank 13 and pan 4, the heat beneath the pan will be gradually shut off.

Should the pans 4 at any time during the operation become practically empty, an automatic lifting and damper operating device is brought into play. This comprises a tripod or stand 35 consisting of a plurality of arms projecting upwardly through the frame and being adapted to receive and support the evaporating pans. These stands are slidably mounted in the frame and secured to rings or collars 36, the collars, in turn, being connected to the inner ends of levers 37 pivotally suspended from the bottom of the frame and operated by weights 38 adjustably mounted on their outer ends. The weights 38 are adjusted so that they will just balance the pans 4 when the pans are practically empty. Consequently, as soon as the pan becomes empty the weight 38 acts at once to raise it from the heating surface on which it is placed.

To provide for the further efficiency of the device, links or rods 39 are connected to the stands and have their opposite ends pivoted to the dampers 41 and the dampers 41, in turn, have pivoted thereto rods 40, the opposite ends of which are similarly connected to dampers 42. The dampers 41 and 42, respectively, cut off all the heat passing from the fire box 2 to the pans 4 and from the pans 4 to the pan where the final evaporation is effected. Thus, it will be seen, the weight operated device acts to raise the pans from the heated surface and to shut off the heat from said surface at the same time.

In order to further facilitate the operation of the dampers 42 a weighted arm 43 is connected to the outer end thereof, the lower end of the arm being pivotally connected to the arm of the slide damper 44 which controls the passage of the products of combustion from the fire box to the chimney. Thus, the dampers 44 will be opened at the same time as the dampers 41 and 42 are closed and at the same time that the pan 4 is raised from the heating surface.

It is clear that many changes may be made in the construction, arrangement and detail of the several parts and many substitutions may be used for these parts without in any way departing from the field and scope of the present invention, and it is meant to include all such within this application, wherein only a preferred form of the apparatus has been shown and described.

Having thus fully described our invention, what we claim as new and desire to secure by Letters Patent is:

1. An apparatus of the character described comprising, a frame, a heating chamber therein, evaporating pans adapted to be mounted in said frame to either side of the heating chamber, flues adapted to convey heat from the chamber to said pans, and means for automatically regulating the delivery of the heat to the pans.

2. An apparatus of the character described comprising, a frame, a heating chamber therein, pans disposed on the frame to either side of said chamber, means for conducting heat from said heating chamber to said pans, means for automatically controlling the delivery of heat to the pans, and means for automatically raising said pans from said frame as the heat is shut off from the same.

3. An apparatus of the character described comprising, a frame, a heating chamber disposed centrally thereof, evaporating pans mounted on said frame to either side of said heating chamber, means for delivering heat from said chamber to said pans, dampers for controlling the delivery of heat to the pans, means for automatically operating said dampers to regulate the delivery of heat, and means for automatically raising said pans from said frame as the dampers are operated.

4. An apparatus of the character described comprising, a frame, a heating chamber disposed centrally thereof, evaporating pans mounted on said frame to either side of said heating chamber, flues for delivering heat from said chamber to said evaporating pans, dampers adapted to control the delivery of heat, weight operated means for automatically raising said evaporating pans from said frame at predetermined periods, and connections between said weight operated means and the aforesaid dampers whereby the dampers are operated by the operation of the weight operated means.

5. In an apparatus of the character described, a frame, a heating chamber disposed centrally thereof, evaporating pans mounted on said frame to either side of said heating chamber, a third evaporating pan mounted centrally of said frame and above said heating chamber, flues for delivering heat from said chamber to the first named pans, a flue for delivering heat from said first named pans to the last named pan, dampers for controlling the delivery of heat through all of said flues, and means for automatically operating said dampers.

6. An apparatus of the character described comprising, a frame, a heating chamber disposed centrally thereof, evaporating pans mounted on said frame to either side of said heating chamber and provided with lateral heat conducting tubes, a third evaporating pan mounted centrally of said frame and above said heating chamber, a heat conducting flue communicating with the passages through the first named evaporating pans and passing beneath said third pan, dampers adapted to control the passage of heat through said flues, and means for automatically operating said dampers.

7. In an apparatus of the character described, a frame, a heating chamber disposed centrally thereof, evaporating pans mounted in said frame to either side of said heating chamber, means for controlling the delivery of heat to said pans, means for delivering sap to said pans, and float operated means adapted to actuate the heat controlling means.

8. In an apparatus of the character described, a framework, a heating chamber disposed centrally thereof, evaporating pans mounted in said framework to either side of said heating chamber, means for delivering heat from said heating chamber to said pans, means for delivering sap to said evaporating pans, means for controlling the delivery of sap to said pans, means for controlling the delivery of heat to said pans, float operated means adapted to actuate the heat controlling means, and means for automatically raising said pans when the sap therein has fallen below a predetermined point.

In witness whereof we have hereunto set our hands in the presence of two witnesses.

WILFRID GAULIN.
ANTHIME GAULIN.

Witnesses:
EMILE HAMEL,
CHARLES EMILE ALIX.